No. 731,311. PATENTED JUNE 16, 1903.
W. F. LEAVELL.
UNIVERSAL FRACTION RULE OR SCALE.
APPLICATION FILED MAR. 30, 1903.
NO MODEL.
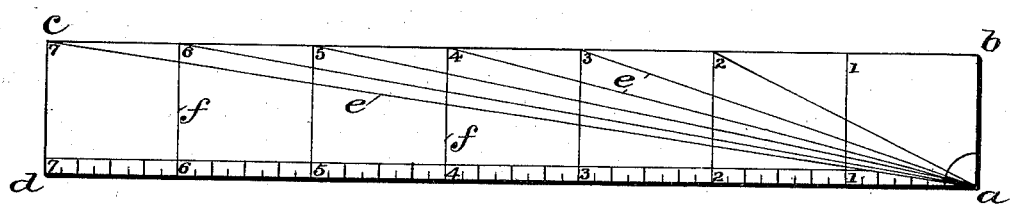
WITNESSES:
Jos. A. Ryan
Geo. S. Brock
INVENTOR
Walter F. Leavell.
BY Munn & Co.
ATTORNEYS.

No. 731,311.

Patented June 16, 1903.

UNITED STATES PATENT OFFICE.

WALTER FRANKLIN LEAVELL, OF CASTLEROCK, WASHINGTON.

UNIVERSAL FRACTION RULE OR SCALE.

SPECIFICATION forming part of Letters Patent No. 731,311, dated June 16, 1903.

Application filed March 30, 1903. Serial No. 150,175. (No model.)

*To all whom it may concern:*

Be it known that I, WALTER FRANKLIN LEAVELL, of Castlerock, in the county of Cowlitz and State of Washington, have invented a new and useful Improvement in Universal Fraction Rules or Scales, of which the following is a specification.

My invention relates to an improvement in rules or scales, its object being to provide a device by means of which all the fractions of an inch not usually found on an ordinary rule may be readily obtained, while at the same time the ordinary linear scale-measure may be used on the same instrument.

My invention consists of a rule or scale one inch in width and any desired length with cross-lines at the end of each inch and slanting or oblique radial lines beginning at the corner of the lowest unit and running to the top end of each cross-line, respectively.

In the ordinary and commonly-used rules or scale-measures the edge is usually divided into inches and such fractions of the inch as one-half, one-fourth, one-fifth, one-eighth, and one-tenth. Now it is frequently desired to use a measurement of one-seventh, two-sevenths, three-sevenths, one-sixth, one-ninth, five-twelfths, &c. This cannot be readily and easily done on these ordinary rules or scale-measures aforesaid. I have therefore devised the rule or scale-measure the practical embodiment of which is set forth in this specification and the drawing herewith, forming a part of this application.

In the drawing the figure represents a face view of a rule or scale-measure marked off in accordance with my invention.

The rule or scale is to be one inch wide and any suitable number of inches in length. In this particular instance I have shown a rule seven (7) inches in length; but said rule may be any length—as, for instance, the ordinary twelve-inch-in-length rule.

I will designate the line or edge extending from the lower right-hand corner to the lower left-hand corner as $a\,d$ and the line or edge extending from the upper right-hand corner to the upper left-hand corner as $b\,c$. The lower edge or line $a\,d$ is subdivided into the usual inch graduations. At the end of each inch cross-lines perpendicular to the line $a\,d$ are drawn or made on the face of the rule or scale, and said cross-lines extend entirely across the face of the rule or scale. The numeral designating the inch is placed at each end of each cross-line. For instance, at each end of the cross-line drawn from the fourth inch-mark the numeral "4" is placed.

From the zero-point of the scale or beginning of the lowest unit (which in this particular instance is at the lower right-hand corner) are extended radial lines $e$ to the upper end of each cross-line, with the exception of the one-inch cross-line.

Now to find any desired fraction of an inch find the numerator of said fraction on the line $a\,d$ and the denominator on the line $b\,c$. The distance measured on that particular cross-line from the numerator to where that particular cross-line intersects the radial line running to the denominator is the required fraction of the inch. For example, suppose it is desired to secure the measurement corresponding to four-sevenths of an inch. One end of a pair of dividers is put on "4" on the line $a\,d$ and the other end carried to point where the first or lowermost radial line (it being the line extending from the corner $a$ to the corner $c$ in a seven-inch rule) intersects the cross or transverse line extending from "4" on line $a\,d$ to "4" on line $b\,c$. The result will be four-sevenths of an inch. To get four-sixths of an inch, one end is placed at "4" on line $a\,d$, as before, and the other at the point where the second radial line intersects the cross-line "4 4." The principle of this rule or scale-measure is this: The radial line $a\,c$ diverges from the line $a\,d$ one inch in seven inches (in this particular instance) of $a\,d$. Hence it diverges two-sevenths of an inch in two inches, and so on, the number of inches on $a\,d$ being each time the numerator and the length of the rule ("7" in this particular instance, where sevenths are desired) being the denominator and the distance on the cross or transverse lines from $a\,d$ up to $a\,c$ being the desired fraction. In the same way any other radial line gives the fraction whose denominator is the number at end of that particular radial line.

It will be observed that this rule will give all fractional denominations of measurement, depending only on the length of the rule-scale.

My improvement in no way interferes with the dividing of the edges into the ordinary dimensions nor in the use of reverse side for scales or other purposes. It is also cheap and may be made of steel, celluloid, wood, gutta-percha, or any other suitable substance and is particularly suitable for drawing outfits and for sale in "scholars' companions," such as school-children buy. It may also be used as an advertising medium. This scale may be laid out, as shown, on a rule, or it may be laid out on any suitable article or material.

Having thus described my invention, what I claim as new, and desire to secure by Letters Patent, is—

1. A universal fractional scale consisting of a ruler of a width equal to the unit of the scale, and having a series of transverse lines dividing it according to its unit and provided further with a series of diagonal lines on its face, said lines starting at a common point at one edge of the rule at the initial point of the scale and radiating thence and terminating at their other ends at the terminals of successive transverse unit division-lines whereby any fraction of the unit of the scale may be determined.

2. A rule or scale comprising a suitable plate whose width is that of the unit of measure and of any desired length, having along its longitudinal boundaries characters designating units of length, transverse lines extending perpendicularly across said plate from each of said characters on one edge to the similar character on the opposite edge, and radial lines each beginning at the zero-point of the scale on one boundary and extending to the end of each transverse line on the opposite boundary.

WALTER FRANKLIN LEAVELL.

Witnesses:
- WILLIAM C. MANLY,
- E. P. BAKER.